United States Patent [19]

Yoda

[11] Patent Number: 5,239,594
[45] Date of Patent: Aug. 24, 1993

[54] SELF-ORGANIZING PATTERN CLASSIFICATION NEURAL NETWORK SYSTEM

[75] Inventor: Fumio Yoda, Hillsboro, Oreg.

[73] Assignee: Mitsubishi Denki Kabushiki Kaisha, Japan

[21] Appl. No.: 832,678

[22] Filed: Feb. 6, 1992

Related U.S. Application Data

[63] Continuation of Ser. No. 654,424, Feb. 12, 1991, abandoned.

[51] Int. Cl.$^5$ .............................................. G06K 9/62
[52] U.S. Cl. ...................................... 382/15; 382/36; 395/24
[58] Field of Search ...................... 382/14, 15, 36, 37, 382/38, 39; 364/274.9, 916.2; 395/21, 24, 27

[56] References Cited

U.S. PATENT DOCUMENTS

| | | | |
|---|---|---|---|
| 3,950,733 | 4/1976 | Cooper et al. | 364/513 |
| 4,044,243 | 8/1977 | Cooper et al. | 364/513 |
| 4,326,259 | 4/1982 | Cooper et al. | 369/715 |
| 4,760,604 | 7/1988 | Cooper et al. | 382/15 |
| 4,774,677 | 9/1988 | Buckley | 382/15 |
| 4,805,225 | 2/1989 | Clark | 382/15 |
| 4,914,708 | 4/1990 | Carpenter et al. | 382/14 |
| 4,958,375 | 9/1990 | Reilly et al. | 382/14 |
| 5,033,006 | 7/1991 | Ishizuka et al. | 364/513 |
| 5,048,100 | 9/1991 | Kuperstein | 382/36 |
| 5,060,278 | 10/1991 | Fukumizu | 382/38 |

OTHER PUBLICATIONS

Sebestyen, G., Decision Making Processes Recognition MacMillan 1962, pp. 17-24, 37-53, 91-96, 108-112, 120-131, 142-151.

R. Duda et al., *Pattern Classification and Scene Analysis*, 1973, pp. 1-7.

C. Suen et al. "Automatic Recognition of Handprinted Characters-The State of the Art", *Proc. of IEEE*, Apr. 1980, 469-487.

J. Makhoul et al., "Vector Quantization in Speech Coding", *Proc. of IEEE*, Nov. 11, 1955, pp. 1551-1588.

R. Lippmann, "An Introduction to Computing with Neural Nets", *IEEE ASSP Magazine*, Apr. 1987, pp. 4-22.

D. Reilly et al., "Learning System Architechtures Composed of Multiple Learning Modules," *Proc. of 1st Nat'l Conf. on Neural Info. Proc.*, 1987.

*Primary Examiner*—Joseph Mancuso
*Assistant Examiner*—David Fox
*Attorney, Agent, or Firm*—Wolf, Greenfield & Sacks

[57] ABSTRACT

A self-organizing pattern classification neural network system includes means for receiving incoming pattern of signals that were processed by feature extractors that extract feature vectors from the incoming signal. These feature vectors correspond to information regarding certain features of the incoming signal. The extracted feature vectors then each pass to separate self-organizing neural network classifiers. The classifiers compare the feature vectors to templates corresponding to respective classes and output the results of their comparisons. The output from the classifier for each class enter a discriminator. The discriminator generates a classification response indicating the best class for the input signal. The classification response includes information indicative of whether the classification is possible and also includes the identified best class. Lastly, the system includes a learning trigger for transferring a correct glass signal to the self-organizing classifiers so that they can determine the validity of their classification results.

6 Claims, 10 Drawing Sheets

SELF-ORGANIZING PATTERN CLASSIFICATION NEURAL NETWORK SYSTEM

This application is a continuation of application Ser. No. 654,424, filed Feb. 12, 1991, now abandoned.

BACKGROUND OF THE INVENTION

1. Field of the Invention

The present invention relates generally to pattern classification systems and, more particularly, to a compound pattern classification system using neural networks which is able to vary a response signal by learning from repeatedly input pattern signals to provide correct classification results.

2. Description of the Prior Art

Pattern classification systems, such as character or voice recognition systems, separate and identify classes of incoming pattern signals. FIG. 1 shows a conventional pattern classification system such as described by Richard O. Duda and Peter E. Hart in *Pattern Classification and Scene Analysis*, Wiley-Interscience Publishers, pp. 2-4. This classification system includes an input transducer 1, such as a television camera, which performs opto-electronic conversion of characters to generate pattern signals S providing characteristic information about the characters. The system further includes a feature extractor 2 which receives the pattern signals S and generates feature vectors F useful for classifying the characters. The system is also provided with a classifier 3 which classifies the characters and generates classification responses P based on the distributions of the feature vectors F. In order to make such classifiers, pattern recognition techniques, such as a linear discrimination method, have been developed. However, the classification systems using these techniques are unable to learn by adjusting classes to account for new input patterns or to create new classes. Consequently, it is necessary to manually develop the information for classifying pattern signals and manually incorporate the information into the system. This manual development and incorporation diminishes the efficiency of the system and provides another potential source for error (i.e. human error).

In order to solve this problem, many self-organizing pattern classifiers have been proposed which are able to organize themselves correctly to separate a given number of pattern signals into their classes. An example of a self-organizing pattern classifier is that which make use of a back propagation learning method such as shown by Richard P. Lippmann in "An Introduction to Computing with Neural Nets," IEEE ASSP Magazine, April 1987, Vol. 4, No. 2, pp. 4-22. The back propagation technique is an iterative gradient algorithum that seeks to minimize the mean square error between actual output and desired output. Another example of a self-organizing pattern classifier is the learning vector quantization 2 technique such as shown by Teuvo Kohonen, Gyorgy Barna, and Ronald Chrisley, "Statistical Pattern Recognition with Neural Networks: Benchmarking Studies," *Proceedings of IEEE International Conference on Neural Networks*, Jul. 24-27 1988, Vol. 1, pp. 61-68.

These self-organizing pattern classifiers suffer the drawback that when they make a wrong classification, they modify the information about stored weighting data to attempt to yield more accurate results. FIG. 2 shows the distributions of two classes $C_A$ and $C_B$ in a two dimensional vector space defined by feature axes X1 and X2. The above self-organizing classifiers are able to make correct boundaries 9 by using the back propagation learning method or learning vector guantization 2 technique (referenced above) to separate the two classes $C_A$ and $C_B$.

As long as the distributions of the respective feature vectors F, each consisting of N elements f1, f2, ..., fN, do not overlap each other, the above classifiers are able to learn to provide correct classification with high classification rates. However, as FIG. 3 shows, when the distributions 10 and 11 of the feature vectors F of two classes $C_A$ and $C_B$ overlap each other in an area 12, none of the above learning techniques make it possible to separate these two classes.

When a large number of classes are identified, such as are used with classifying Chinese characters, it is rare for a feature vector of a given class to not overlap with feature vectors of other classes (hereinafter such feature vector will be referred to as a "single aspect feature vector"). Thus, the above described self-organizing classifiers which have been designed for single aspect feature vectors fail to provide high recognition rates for multiple aspect feature vectors.

One approach to overcoming this problem of overlapping feature vectors of different classes is to utilize multiple features. FIG. 4 provides an example wherein a single feature is used. In particular, it shows the distributions 13 and 14 of brightness features F1 for ash wood and birch wood respectively, as described in *Pattern Classification and Scene Analysis*, at pp. 2-4. FIG. 5 provides an example wherein multiple features are used. FIG. 5 shows the distributions 15 and 16 of ash wood and birch wood, respectively, with respect to the brightness feature F1 and the grain prominence feature F2. In FIG. 4, there is a large overlapping area in the brightness feature F1 of the ash wood 13 and the birch wood 14. As such, it is impossible to make correct classification using only the brightness feature F1. However, as shown in FIG. 5, by using both the brightness feature F1 and the grain prominence feature F2, it is possible to classify these two objects correctly. In this way, by inputting two or more feature vectors, the use of multiple features does not suffer the drawback described above for single feature approaches.

However, a drawback with the use of multiple feature vectors is that the features of feature vectors F1, F2, ..., FN (where N is a positive integer) are not generally related. As a result, not only large areas of memory but also large amounts of computing time are necessary to input the N feature vectors F1, F2, ..., FN into the self organizing pattern classifier. For example, suppose that there are no relations among the three feature vectors F1, F2, and F3 which are used to identify an object A. Further suppose that the object A has four different instances F11, F12, F13, and F14 of the feature vector F1, four different instances F21, F22, F23, and F24 at the feature vector F2, and four different instances F31, F32, F33, and F34 of the feature vector F3. Then, it is possible to represent the object A by using a vector F as follows:

$$F = \{F1i, F2j, F3k\}$$

wherein i, j, k=1, 2, 3, 4. Thus, there are 64 (i.e. 4×4×4) different instances, and 192 (i.e. 64×3) vectors are required to represent the object A.

Accordingly, it is an object of the invention to provide a compound self-organizing pattern classification system that effectively utilizes a plurality of different feature vectors.

It is another object of the invention to provide a compound self-organizing pattern classification system which is able to classify pattern signals with accuracies higher than those of respective pattern classifiers by making compound classification based on the outputs of a number of independent self-organizing pattern classifiers into which a number of different feature vectors are input.

SUMMARY OF THE INVENTION

According to the present invention, a self-organizing pattern classification neural network system classifies incoming pattern signals into classes. The system includes feature extractors for extracting different feature vectors from an incoming pattern signal. For instance, if the input is visual data focusing on a piece of wood, the feature extractors might extract the features of grain prominence and brightness from the visual data. The feature extractors are coupled to self-organizing neural network classifiers. A separate neural network classifier is provided for each of the feature extractors. The classifiers receive the feature vectors and generate response vectors comprising a plurality of responsive scalars corresponding to the respective classes. The response scalar is forwarded to a discriminator which receives the response vectors for each class and generates a classification response. The classification response includes information indicative of whether a classification is possible and also information indicating an identified class. Lastly, the system includes a learning trigger for transferring a correct class signal to the self-organizing classifiers based on a class of the training signal and based on the classification response.

It is preferred that each self-organizing classifier is comprised of a neural networks having input nodes for receiving feature scalars of each of the feature vectors and a plurality of intermediate nodes for receiving the feature scalars for said input node. The intermediate nodes also generate a plurality of intermediate outputs that are received by output nodes of a given class. Hence, the intermediate nodes of a particular class are all coupled to a single output node. The output node determines a smallest intermediate output amongst those received from the intermediate node. It transfers this intermediate output to the discriminator as a response scalar. The classifier also includes a self-organizing selector for receiving the smallest intermediate output and a node number of said intermediate node which gives the smallest intermediate output. The self-organizing selector determines a weight update signal based on the node number and intermediate output from this intermediate node. It also determines the correct class signal.

DETAILED DESCRIPTION OF THE PREFERRED EMBODIMENT

Figure 1:
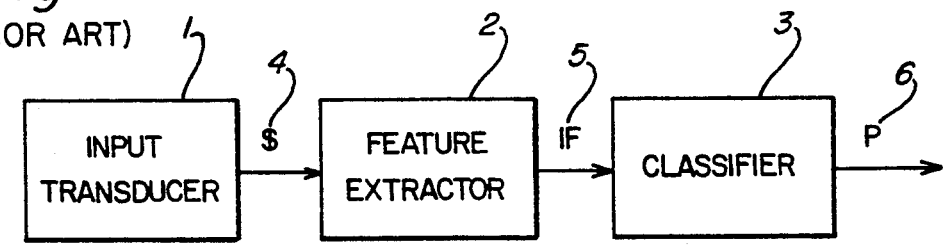
FIG. 1 is a block diagram of a conventional pattern classification system.
Figure 2:
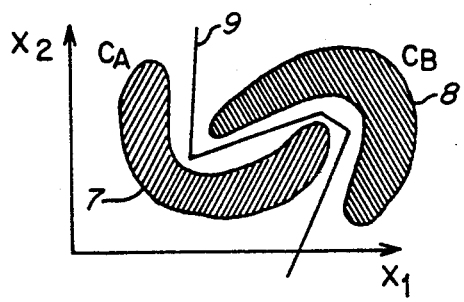
FIG. 2 is a plot illustrating how conventional approaches can distinguish between non-overlapping classes.
Figure 3:
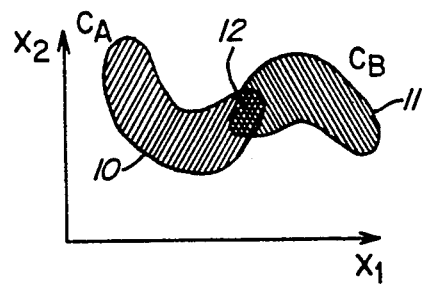
FIG. 3 is a plot illustrating how conventional approaches cannot distinguish between overlapping classes.
Figure 4:
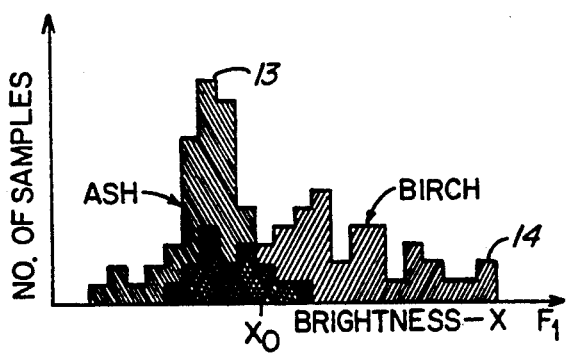
FIG. 4 is a plot of histograms of brightness of ash wood versus birch wood.
Figure 5:
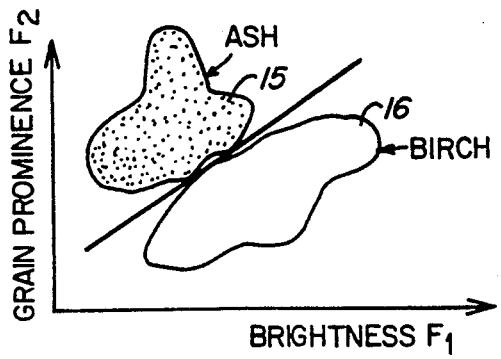
FIG. 5 is a plot illustrating how the features of brightness and grain prominence together accurately distinguish between ash wood and birch wood.
Figure 6:
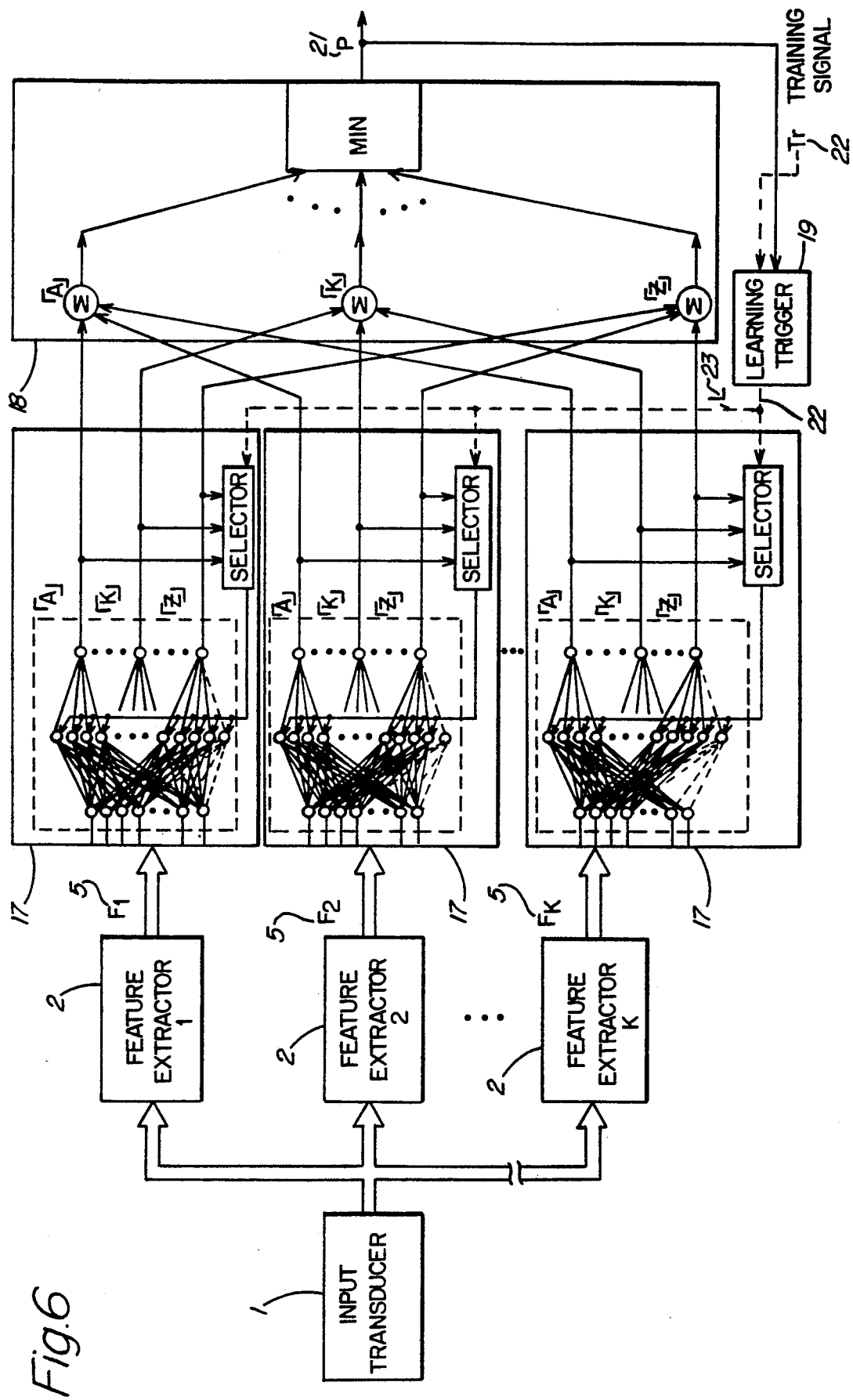
FIG. 6 is a block diagram of a self-organizing pattern classification neural network system according to an embodiment of the invention.

In accordance with a preferred embodiment of the present invention depicted in FIG. 6, a self-organizing pattern classification neural network system includes an input transducer 1, K feature extractors 2 (where K is a positive integer), K self-organizing classifiers 17, a discriminator 18; and a learning trigger 19, all of which are interconnected as shown.

The neural network system operates in either a classification mode wherein pattern signals are classified or a learning mode wherein the weighting vectors stored in the self-organizing classifiers 17 are modified.

In the classification mode, the input transducer 1 generates pattern signal vectors S which represent the object to be classified. For example, when a printed character on paper is to be classified, the input transducer 1 generates, by opto-electronic conversion a pattern signal vector S of a bit-mapped image. In this bit-mapped image, pixel locations where the letter located is represented by values of "1" whereas the other pixel locations are represented by values of "0".

The pattern signal vector S is then transferred to the K feature extractors 2 in parallel. The K feature extractors 2 generate K different feature vectors F1, F2, ..., Fk from the pattern vector S. These feature vectors vary with the object to be identified. The objects to be identified may include characters or voices. The feature vectors are generated by using techniques well known in the prior art. In the character recognition field, for example, a characteristic loci or crossing add distance feature may be extracted as a feature vector F by employing the technique described in C. Y. Suen, M. Berthod, and S. Mori in "Automatic Recognition of Handprinted Characters—the State of the Art," *Proceedings of IEEE*, Vol. 68, No. 4, April 1980, pp. 469-487.

Figure 7:
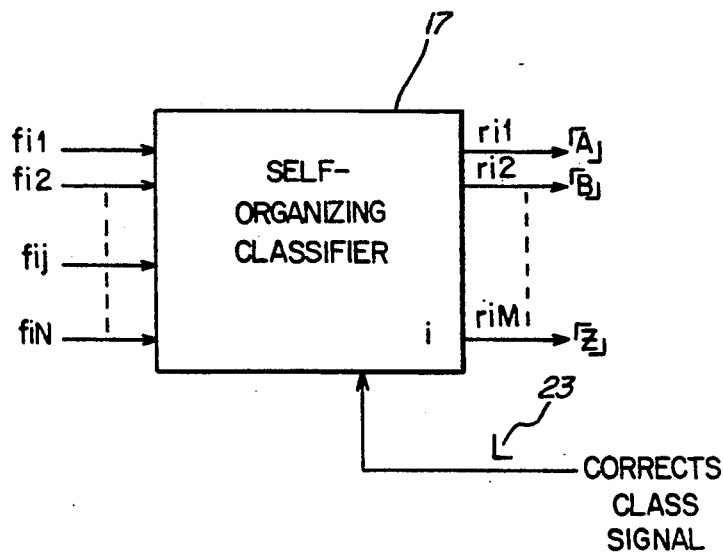
FIG. 7 is an input output diagram of a self-organizing pattern classifier useful for the classification system of FIG. 6.

The K feature vectors F1, F2, ..., FK are then transferred to the corresponding K self-organizing classifiers 17. As FIG. 7 shows, the i-th self-organizing classifier 17 receives a feature vector Fi composed of N feature scalars fi1, fi2, ..., fiN and generates a response vector Ri composed of M response scalars ri1, ri2, ..., riM. These M response scalars ri1, ri2, ..., riM correspond to M classes, and a response scalar rij indicates how far apart the pattern signal S is from the class Cj in terms of the feature vector Fi. For example, when 26 Arabic characters "A" through "Z" are classified, the response vector R is composed of 26 response scalars.

$$R = \{ri1, ri2, \ldots, ri26\}$$

wherein ri1, ri2, ..., ri26 indicate how remote the pattern signal is from the respective letters "A", "B", ..., "Z". The K response vectors R1, R2, ..., RK of the K self-organizing classifiers 17 are then transferred to the discriminator 18, wherein the linear sum of response scalars r1i, r2i, ..., rki of response vectors R1, R2...Rk corresponding to a class Ci is taken to determine total outputs T1, T2, ..., TM for classes C1, C2, ..., CM. The class which gives the smallest total output is determined by the discriminator 18 and output as a classification result P 21.

In the learning mode, a classification result P 21 is determined in the same way as in the classification mode. As FIG. 6 shows, the classification result P 21 is then transferred to the learning trigger 19, wherein whether a correct class signal L 23 is transferred to the self-organizing classifiers 17 is determined based on the classification result P 21 and a training signal Tr 22 which is externally supplied by the user. If the correct class signal L 23 is transferred, the correct class given by the training signal Tr 22 is transferred to all of the self-organizing classifiers 17, wherein the correct class signal L 23 is compared with the output at each output node for modifying the weighting vectors therein.

Figure 8:
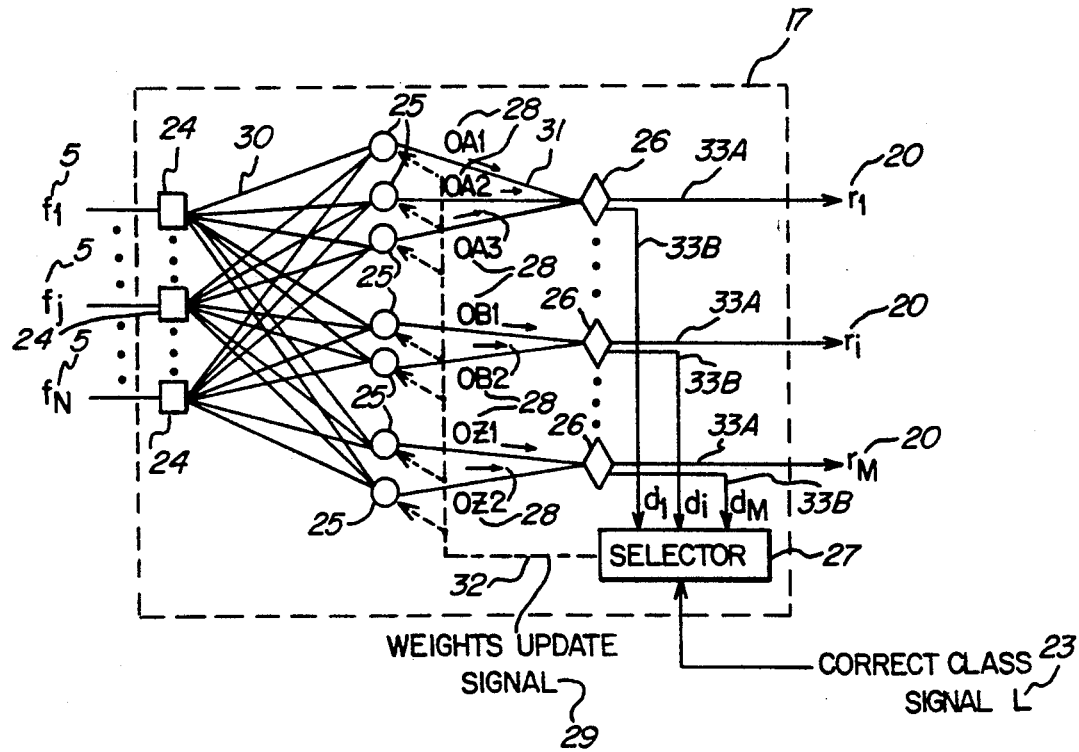
FIG. 8 is a block diagram of the self-organizing pattern classifier of FIG. 7.

FIG. 8 depicts the self organizing classifier in more detail. A suitable classifier is described in copending patent application, "Self-organizing Neural Network for Pattern Classification", Ser. No. 07/654,800. This copending application has the same inventor, the same assignee and was filed on even date herewith as the present application. The self-organizing classifier 17 includes N (where N is a positive integer) input nodes 24 functioning as buffers for receiving N feature scalars f1, f2, ..., fN of a feature vector F. The classifier 17 also includes intermediate nodes 25, each receiving an N-dimensional feature vector F from the N input nodes 24 via N signal lines 30 and generating an intermediate output 28. The classifier 17 additionally includes M (where M is a positive integer) output nodes 26, each receiving intermediate outputs from the intermediate nodes 25 of a class via signal lines 31. Each output node 26 determines the smallest output among those it receives and transfers the node number i of the intermediate node that sent the smallest output along with the smallest output Oi to the self-organizing selector 27 via signal lines 33B. The node number and output value are also sent to the discriminator 18 via a signal line 33A as a response scalar ri of a response vector R. The classifier 17 further includes a self-organizing selector 27 for generating a weight update signal 29 for updating templates encoded in the intermediate nodes on signal lines 32. The weight update signal 29 is based on the number i the output Oi of the intermediate node and the correct class signal L 23 supplied from outside.

Figure 9:
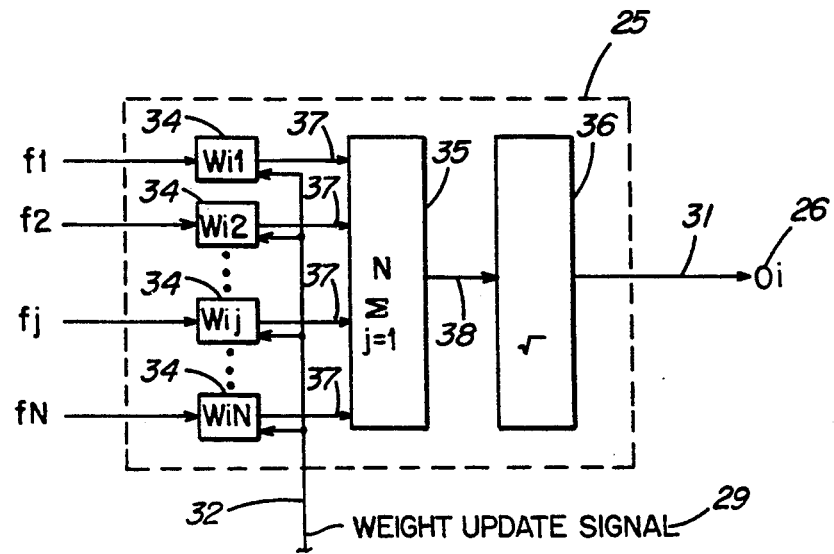
FIG. 9 is a block diagram of an intermediate node of the classification system of FIG. 8.

FIG. 9 shows a more detailed view of intermediate node Ui. Ui includes N element comparators 34, each having a weighting scalar Wi1, Wi2, ..., WiN of a weighting vector Wi, that is compared with a corresponding element of the feature vector F by the element comparator. The results of the comparison indicate the difference between the weighting vector and the feature vector. The intermediate node Ui also includes an adder 35 for summing the results of comparison performed by an element comparator 34 via signal lines 37. Lastly, the intermediate node Ui 25 includes a square root computer 36 for calculating the square root of summed results produced by the adder 35. The square root computer receives the summed results over a signal line 38.

In operation, the self-organizing classifier 17 receives a feature vector F composed of N feature scalars f1, f2, ..., fN and generates a response vector Ri composed of M response scalars ri1, ri2, ..., riM which correspond to the M classes to be separated. More specifically, the input nodes 24 receive the N feature scalars f1, f2, ..., fN of a feature vector F from the feature extractor 2. The intermediate nodes 25 generate an intermediate output 28 based on the feature vector F and the weighting vectors of the element comparators 34. This is accomplished by matching the weighting vectors stored in the intermediate node 25 and the feature vector F as described below. That is, the weighting vectors stored in the element comparators 34 of the intermediate node 25 function as a template which represents the features of a letter.

For example, the intermediate output Oi of the i-th intermediate node Ui is given by the following expression:

$$Oi = 1/N \sqrt{\left( \sum_{j=1}^{N} (fj - Wij)^2 \right)} \quad (1)$$

wherein fj is the j-th feature scalar of the feature vector F and Wij is the j-th weighting scalar stored in the i-th intermediate node Ui.

The intermediate output Oi is computed in the intermediate node Ui as shown in FIG. 9. That is, the difference between each feature scalar fj of the feature vector F and each weighting scalar Wij of the weighting vector stored in the intermediate node Ui is squared in the element comparator 34. The computed results are transferred to the adder 35 via the signal lines 37. The square root computer 36 computes the square root of the summing result from the summer 35 and transfer the intermediate output Oi via the signal line 31 to the output node 26 of the class represented by the intermediate node Ui.

Since the weighting vectors functioning as a template representative of each class are stored in the intermediate node 25, the number of intermediate nodes is greater than that of the classes to be separated. In other words, there are two or more intermediate nodes for each class, indicating the distribution of feature vectors of the class. These intermediate nodes are comparable to templates of the multitemplate technique known in the pattern recognition field. That is, the output Oi of the i-th intermediate node Ui corresponds to the matching between the feature vector F and the template represented by the weighting vector Wi, indicating the Euclidian distance between the feature vector F and the template in the vector space. Consequently, the smaller the intermediate output Oi, the closer the feature vector F and the template represented by the weighting vector Wi.

The output node 26 selects an intermediate node which gives the smallest intermediate output among the intermediate nodes 25 of the class and transfers a response scalar of the response vector R 20 to the self-organizing selector 27 via the signal line 33B.

Figure 10:
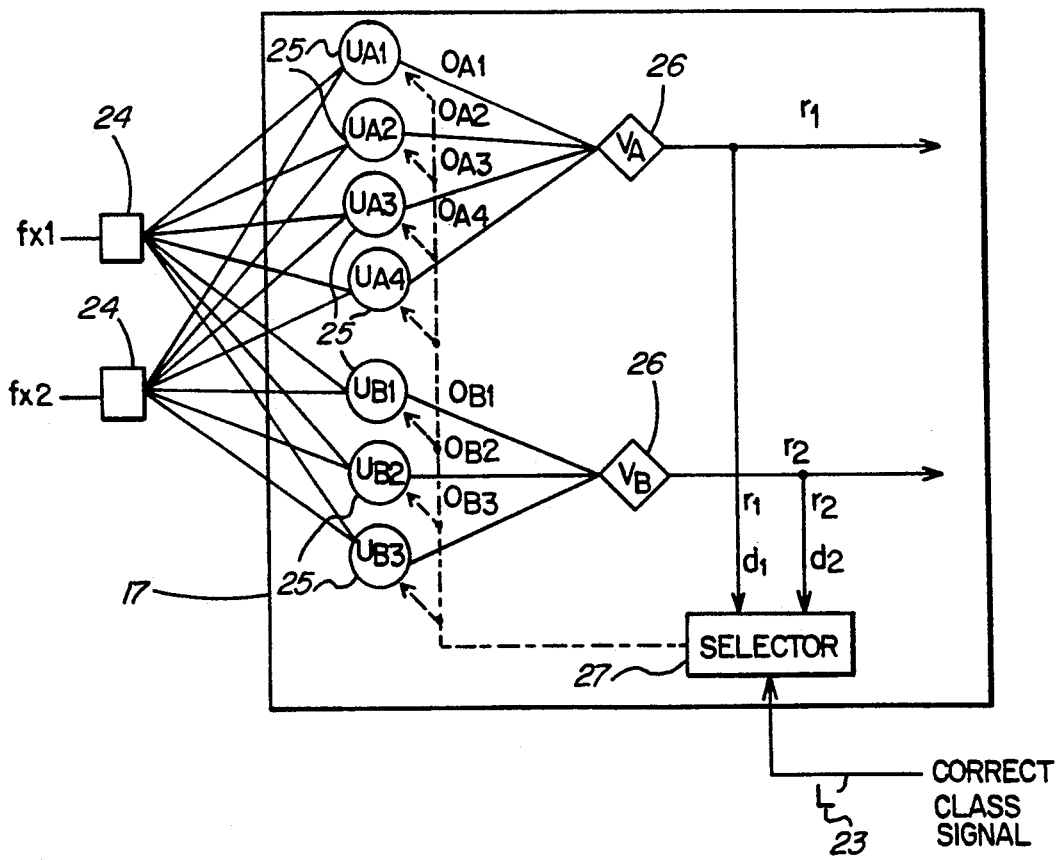
FIG. 10 is an example of a block diagram of the self-organizing classifier of FIG. 8.
Figure 11:
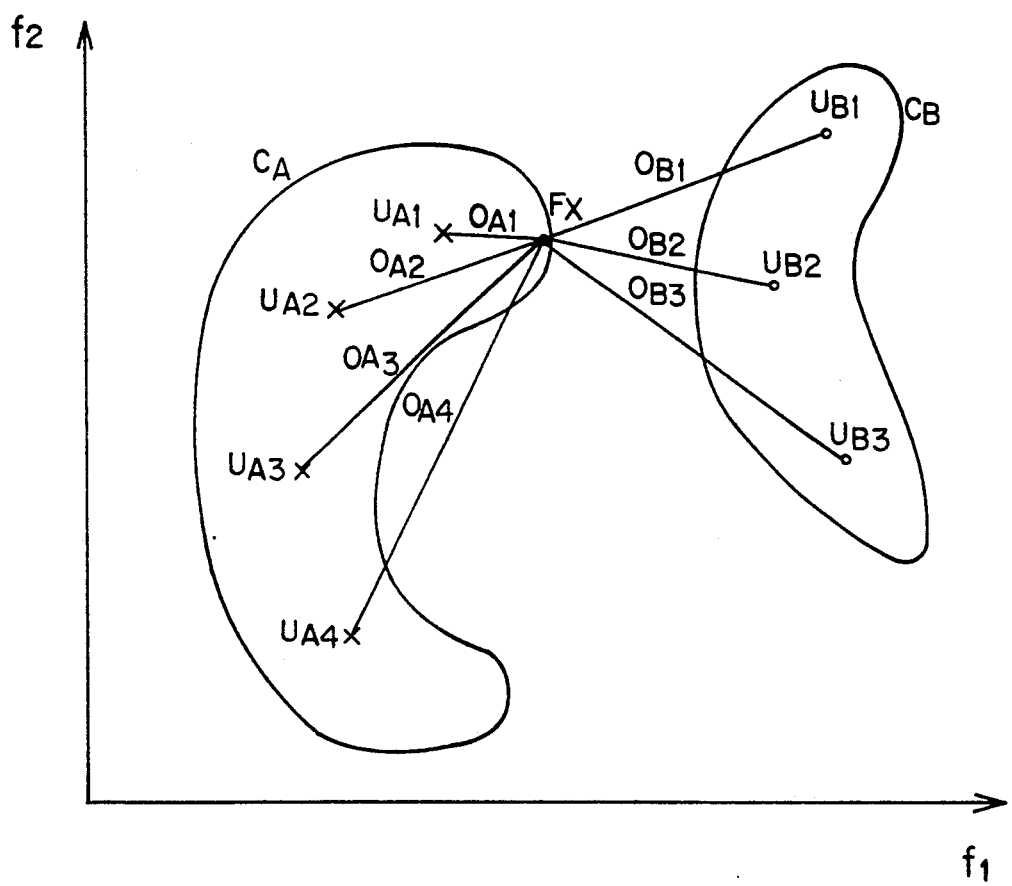
FIG. 11 is a plot of a vector space illustrating intermediate nodes for two different classes.

FIG. 10 shows a self organizing classifier 17 for receiving a 2-dimensional feature vector $Fx = \{fx1, fx2\}$ and separating two classes $C_A$ and $C_B$. Intermediate nodes $U_{A1}$, $U_{A2}$, $U_{A3}$, and $U_{A4}$, and $U_{B1}$, $U_{B2}$, and $U_{B3}$ represent respective classes $C_A$ and $C_B$. Output nodes $V_A$ and $V_B$ represent these classes $C_A$ and $C_B$. As FIG. 11 shows, when the feature vector Fx is inputted to the self-organizing classifier 17, the intermediate outputs $O_{A1}$, $O_{A2}$, $O_{A3}$, and $O_{A4}$, and $O_{B1}$, $O_{B2}$, and $O_{B3}$ are computed according to the aforementioned expression (1), indicating the respective distances between the feature vector F and the templates represented by the weighting vectors of the respective intermediate nodes. The output node $V_A$ of the class $C_A$ selects the smallest output $O_{A1}$ as a representative of the class and transfers it as an element r1 of response vector R to the discriminator 18. It also transfers the node number "A1" and the output $O_{A1}$ to the self-organizing selector 27. The output node $V_B$ of the class $C_B$ selects the smallest output $O_{B2}$ as a representative of the class $C_B$ and transfers it as an element r2 of response vector R to the discriminator 18, and the node number "B2" and the output $O_{B2}$ to the self organizing selector 27.

The self-organizing selector 27 modifies the weighting vector in the intermediate node based on the correct class signal L supplied by learning trigger 19. More specifically, upon receipt of the correct class signal L 23, the self-organizing selector 27 selects, as a response signal, the class corresponding to the smallest intermediate output among the intermediate outputs representing respective classes. It then compares the class of the smallest intermediate output with the class given by the correct class signal L 23.

If the class of the response signal is identical with the class of the correct class signal L 23, the self-organizing classifier is determined to make a correct classification, and no modification is made to the weighting vectors in the intermediate node.

If the class of the response signal is different from the class of the correct class signal L 23, on the other hand, the self-organizing classifier modifies the weighting vectors of the intermediate node depending on which of the following causes for the incorrect classification brought about incorrect classification:

(1) the incoming pattern signal was very remote from the template represented by the weighting vector of the intermediate node of the correct class in the vector space;

(2) there is a weighting vector of an intermediate node, having a class other than the correct class, which is very close in the vector space to the weighting vector in the intermediate node of the correct class; and (3) none of the above.

Figure 12:
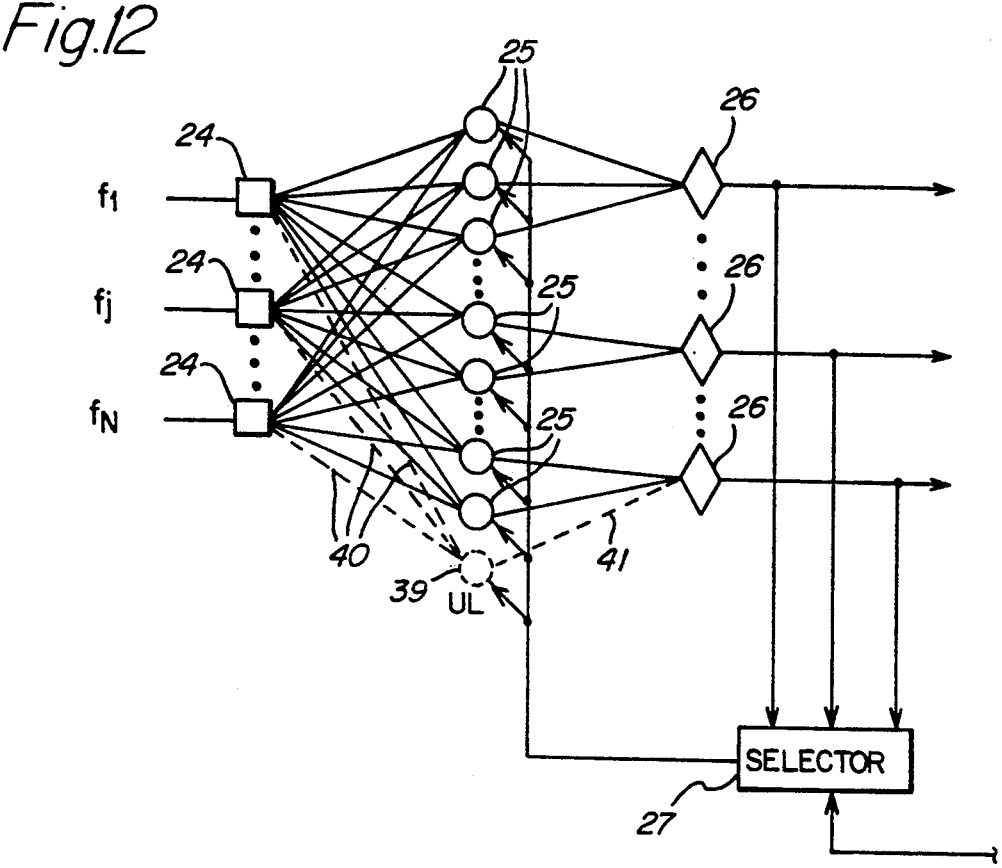
FIG. 12 is a block diagram of a self-organizing classifier in which a new intermediate node is added.

If there does not exist an output node of a class identical with the correct class, a warning message is outputted, and the learning process is terminated. If there exists an output node of a class identical with the correct class, the self-organizing selector 27 carries out the following process:

It is determined whether the output Oj of the intermediate node Uj of a class which is identical with the correct class satisfies the following expression:

$$Oj \geq th1 \qquad (2)$$

wherein th1 is a predetermined threshold constant. For more information on th1, see the copending patent application entitled "Self-organizing Neural Network for Pattern Classification" referenced above. The expression (2) indicates that the Euclidian distance in a vector space between the feature vector and the template represented by the weighting vector of an intermediate node Uj of the correct class is greater than or equal to th1. A large value is used for the constant th1. If the condition is satisfied, it means that an incoming feature vector is very remote in the vector space from the template represented by the weighting vector of an intermediate node of the correct class which has been registered. Consequently, if the condition is satisfied, a new network consisting of an intermediate node 39, N signal lines 40 for connecting the input nodes 24 to the intermediate node 39, and a signal line 41 for connecting the intermediate node 39 to the output node 26 of the correct class are added to the network as shown in FIG. 12. The weighting vector of the intermediate node 39 is realized by assigning the N scalars f1, f2, ... fN of the feature vector F as the elements of the weighting vector.

If the expression (2) is not satisfied, the smallest output Oi among the intermediate outputs for the respective output nodes is determined. The intermediate node Ui that produced the smallest output Oi is also determined. The output Oj of an intermediate node Uj of a class obtained from the output node of the correct class is also determined. Then, it is determined whether these two outputs Oi and Oj satisfy the following expression:

$$Oj - Oi \leq th2 \qquad (3)$$

wherein th2 is a predetermined threshold constant. For more information on th2, see copending patent application entitled "Self-organizing Neural Network for Patten Classification". If expression (3) is satisfied, the classification results are incorrect due to the template represented by the weighting vector in the intermediate node Uj of the correct class being close to the template of Ui of the wrong class. In this case, the weighting vectors of the intermediate nodes Ui and Uj are modified according to the following expressions:

Weight of Ui: $Wik = Wik - \alpha[fk - Wik]$ for $k=1, \ldots N$

Weight of Uj: $Wjk = Wjk + \alpha[fk - Wjk]$ for $k=1, \ldots N$ (4)

wherein fk is the k-th feature scalar of the feature vector F, Wik is the k-th scalar of the weighting vector in the i-th intermediate node Ui, and $\alpha$ is a sufficiently small positive real number. $\alpha$ is described in more detail in the copending patent application referenced above.

Figure 13:
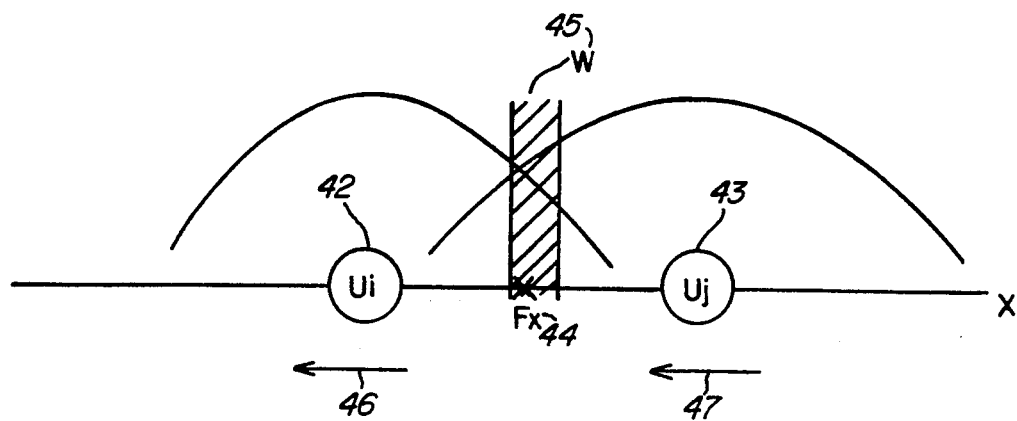
FIG. 13 is a graph illustrating an example wherein templates for different classes are too closely situated.

The above modifications to the weighting vectors are illustrated in FIG. 13, wherein the intermediate node Ui 42 is the node which does not belong to the correct class and the intermediate node Uj 43 is the node which belongs to the correct class. The feature vector is designated as Fx 44 and the window W 45 is between the intermediate nodes Ui and Uj, and 46 and 47 are arrows indicating the directions in which the intermediate nodes Ui and Uj are moved. When expression (3) is satsified, the feature vector Fx falls within the window W 45 between the intermediate nodes Ui and Uj. This implies that the weighting vector in the intermediate node Uj, which belongs to the correct class, and the weighting victor in the intermediate node Ui, which does not belong to the correct class, are very close.

The first equation of the expression (4) directs the modification of the weighting vector of the intermediate node Ui so that the template represented by the weighting vector of the intermediate node Ui is separated further from the feature vector Fx in the vector space as shown by the arrow 46. The second equation of the expression (4) directs the modification of the weighting vector of the intermediate node Uj so that the template represented by the weighting vector of the intermediate node Uj is brought closer to the feature vector Fx in the vector space as shown by the arrow 47. These modifications to the weighting vectors are repeated so as to clearly place the input signal in the correct class to facilitate higher classification rates.

If neither expression (2) nor expression (3) are satisfied, the weighting vector of the intermediate node Uj is modified according to the following equation:

$$\text{Weight of Uj: } W_{jk} = W_{jk} + \alpha[f_k - W_{jk}] \text{ for } k = 1, \ldots N \quad (5)$$

wherein fk is the k-th feature scalar of the feature vector F, Wik the k-th weighting scalar of the weighting vector in the i-th intermediate node Ui, and $\alpha$ is a sufficiently small positive real number.

Expression (5) is the same as the second equation of expression (4), indicating that the weighting vector of the intermediate node Uj is modified so that the template represented by the weighting vector of the intermediate node Uj is brought closer to the feature vector F in the vector space.

Figure 14:
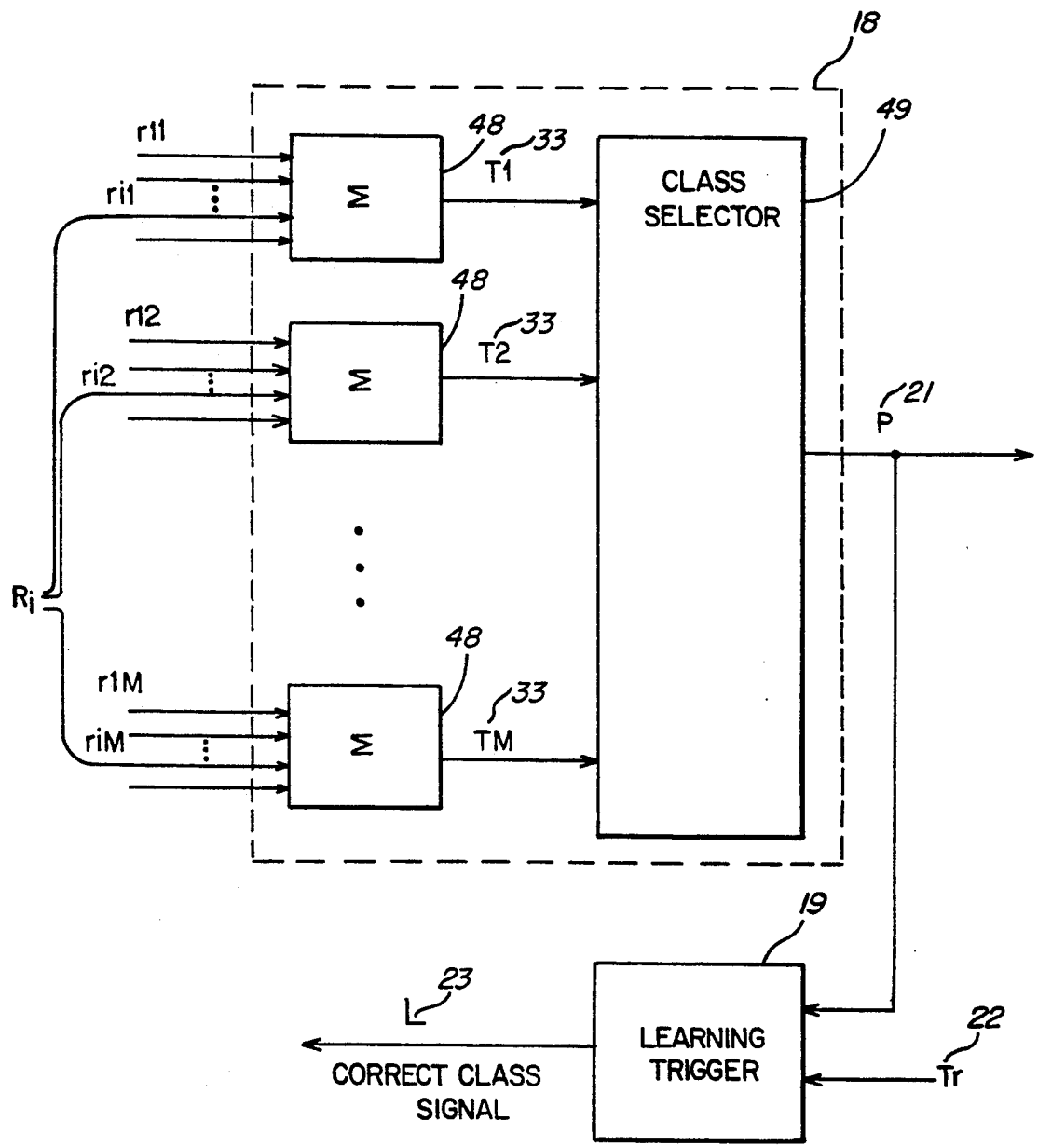
FIG. 14 is a block diagram of a discriminator useful for the classification system of FIG. 6.
Figure 15:
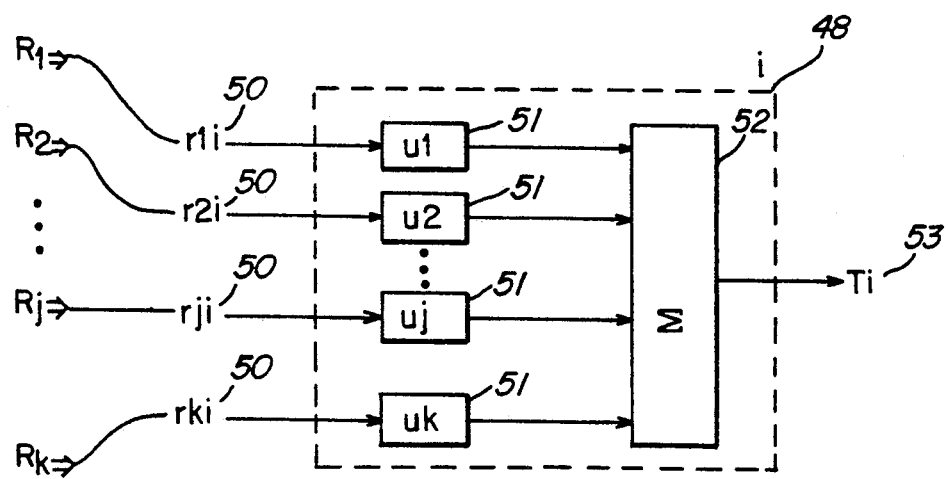
FIG. 15 is a block diagram of a class summing node useful for the discriminator of FIG. 14.

In FIG. 14, the discriminator 18 includes M class summing nodes 48 (where M is a positive integer) and a class selector 49. It receives K response vectors R1, R2, ..., Rk from the K self-organizing classifiers at the class summing nodes 48 for each class. A linear summation of response scalars r1i, r2i, ..., rji, ..., rki and weighted weighting scalars u1, u2, ..., uk is made in the summer node 48 to provide a total output Ti 53 for the class Ci according to the following equation:

$$T_i = (\sum_{j=1}^{k} (u_j * r_{ji})) \quad (6)$$

wherein uj is a positive constant representative of the class Ci and set so that $\Sigma u_j = 1.0$.

The total output Ti for the class Ci is then transferred to the class selector 49. The class selector 49 selects the smallest total output, Tmin1, among the total outputs T1, T2, ..., TM and the class, Cmin1, of the smallest output. It also selects the second smallest or runner-up total output Tmin2 and its class Cmin2. It then determines whether the classification is correct according to the following expressions:

$$T_{min1} \leq h_1 \quad (7) \text{ and}$$

$$T_{min2} - T_{min1} \geq h_2 \quad (8)$$

wherein h1 and h2 are positive constants. Expression (7) is used to check whether the class Cmin1, which has been determined to be closest to the pattern signal, falls within the predetermined area h1, while expression (8) is used to check whether the class Cmin1, which has been determined to be closest to the pattern signal, and the class Cmin2, which has been determined to be second closest, are close to each other.

If the total output Tmin1 of the class Cmin1 and the total output Tmin2 of the class Cmin2 both satisfy the above expression (7) and (8), the class selector 49 determines that the classification is correct and outputs an accept signal. It also outputs the class Cmin1 as a response signal P 21. If both of the above expressions are not satisfied, the class selector 49 outputs a reject signal and the class Cmin1 as a response signal P 21.

The learning trigger 19 also operates in the learning mode. As FIG. 14 shows, it receives the training signal Tr 22 supplied by the user and the classification response P 21 from the discriminator 49. It subsequently transfers the correct class signal L 23 to the self-organizing classifiers 17. More specifically, if the classification response P 21 is a reject signal or the class Cmin1 indicated by the classification response P 21 is not identical with that of the training signal Tr 22, the learning trigger 19 outputs a correct class signal L, to all of the self-organizing classifiers 18, wherein L 23 corresponds to the pattern signal which has been given by the training signal Tr 22.

Figure 16:
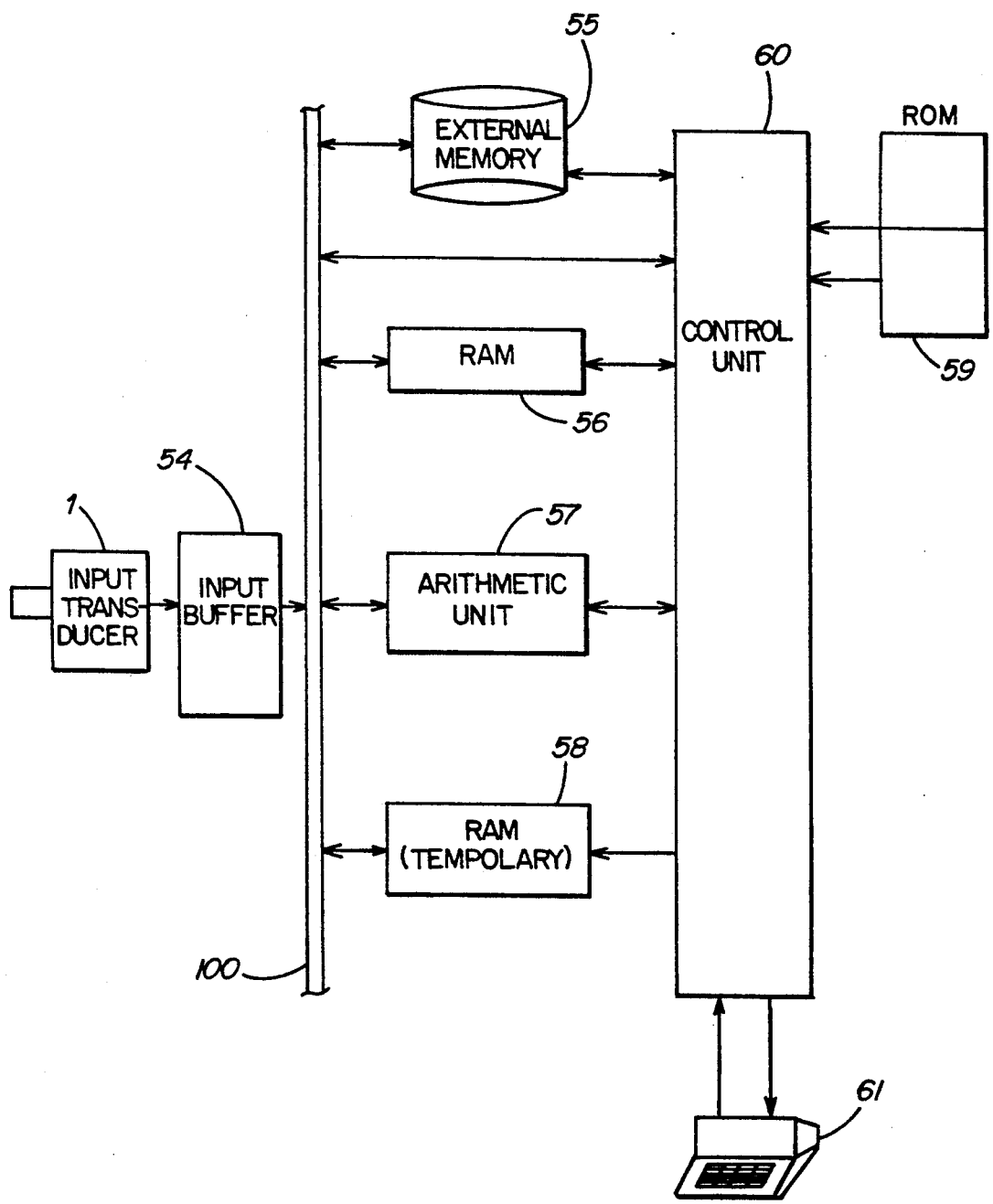
FIG. 16 is a block diagram of a compound self-organizing pattern classification neural network system using a sequential digital computer according to an embodiment of the invention.

FIG. 16 shows a compound self-organizing neural network pattern classification neural network system realized in a sequential digital computer, such as microprocessor. The system includes an input transducer 1, such as a television camera, for transducing an external scene into a digital pattern signal. The system further includes an input buffer 54 for storing the pattern signal and an external memory 55, such as a magnetic disk unit, for saving both the weighting vectors and class information of the self-organizing classifiers. Still further, the system is provided with a random access memory (RAM) 56 for storing the weighting vectors and class information of a self-organizing classifier during operation. An arithmetic unit 57 composed of arithmetic devices, such as adders and multipliers is provided, and a RAM 58 for storing the computation results is included. Lastly, a read only memory (ROM) 59, for storing threshold values and executable programs is included in the system, along with a input unit 61, for inputting a training signal; and a control unit 60. The input buffer 54, external memory 55, RAM 56, 58, arithmetic unit 57 and control unit 60 are all coupled to a bus 100.

Figure 17:
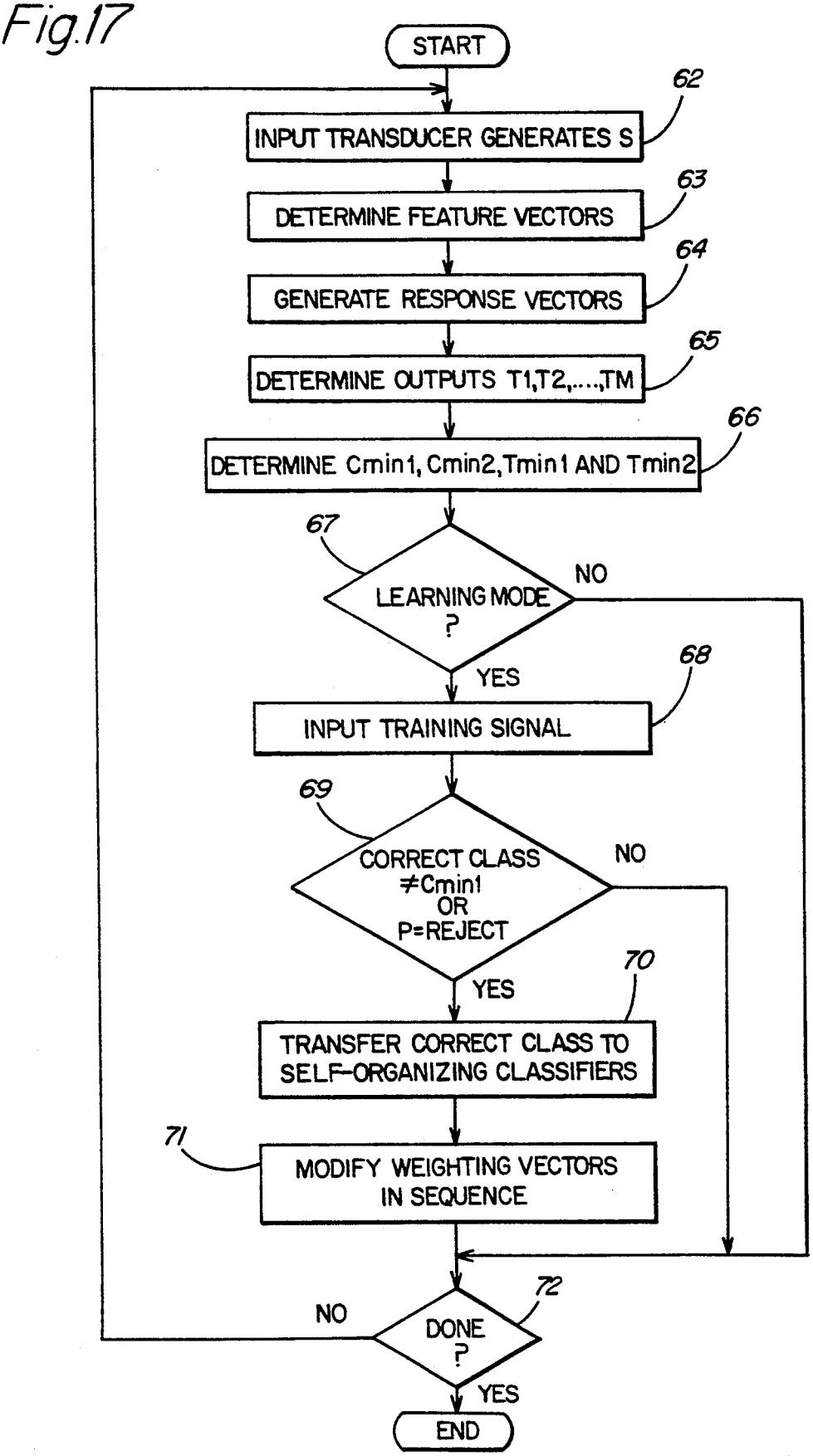
FIG. 17 is a flowchart useful for explaining operation of the classification system of FIG. 16.

FIG. 17 provides a flow chart of how the classification system of FIG. 16 works.

(1) A pattern signal S generated by the input transducer 1 is stored in the input buffer 54. (Box 62 in FIG. 17)

(2) K feature vectors F1, F2, ..., FK are determined in sequence according to a well known algorithm such as described in the aforementioned article "Automatic Recognition of Handprinted Characters—the State of the Art." (Box 63)

(3) K response vectors R1, R2,..., Rk are determined in sequence in the K self-organizing classifiers 17, each corresponding to the K feature vectors F1, F2, ..., FK (Box 64).

(4) M total outputs T1, T2, ..., TM of M classes are determined from the K response vectors R1, R2, ..., Rk according to the expression (6) (Box 65).

(5) Of the M outputs T1, T2, ..., TM, the smallest output Tmin1 and its class Cmin1, and the second smallest output Tmin2 and its class Cmin2 are determined. Further, classification response P are determined according to the expressions (7) and (8) (Box 66).

(6) It is checked whether the learning mode is in use. If it is not in use, the classification response P is output, and control is transferred to the step 11 (Box 67).

(7) A training signal Tr is input (Box 68).

(8) If either the correct class of a pattern signal S given by the training signal is different from the class Cmin1 indicated by the classification response P or the classification response P is a reject signal, control is transferred to the step 9. Otherwise, control is transferred to the step 11 (Box 69).

(9) The correct class of a pattern signal S as given by the training signal is transferred to the K self-organizing classifiers 17 as a correct class signal L (Box 70).

(10) The K self-organizing classifiers 17 modify the weighting vectors of the intermediate nodes according to the aforementioned modification method based on the their response vectors and based on the correct class indicated by the correct class signal L, in sequence from the first self-organizing classifier to the k-th self-organizing classifier (Box 71).

(11) If the user does not terminate the process, control is transferred to step 1 (Box 72).

While the Euclidian distance method by which the intermediate outputs are computed has been described above, the intermediate outputs may be computed by using the well known similarity Pi. This similarity is obtained from an inner product of vectors given by the following equation:

$$O_i = 1 - P_i \qquad (9)$$
$$= 1 - \sum_{j=1}^{N} (f_j * W_{ij}) / \left( \sum_{j=1}^{N} f_j^2 \right) * \left( \sum_{j=1}^{N} W_{ij}^2 \right)$$

wherein $f_j$ is the j-th feature scalar of the feature vector F and $W_{ij}$ the j-th weighting scalar of the weighting vector in the i-th intermediate node.

As has been described above, according to the invention there is provided a flexible and accurate compound self organizing pattern classification system at low costs by combining the classification results of the independent self-organizing classifiers for making a final compound classification.

I claim:

1. A self-organizing pattern classification neural network system for classifying incoming pattern signals into their classes, comprising:
   (a) feature extractors for extracting different feature vectors from an incoming pattern signal;
   (b) self-organizing neural network classifiers, one for each of said features extractors, for receiving the feature vectors and generating response vectors, each response vector comprising a plurality of response scalars corresponding to the respective classes wherein each said self-organizing classifier comprises:
       i) input nodes for receiving feature scalars of each of said feature vectors;
       ii) a plurality of intermediate nodes for receiving said feature scalars for said input nodes and for generating a plurality of intermediate outputs;
       iii) a plurality of output nodes for receiving intermediate outputs of intermediate nodes of a class, for determining a smallest intermediate output, and for transferring, to said discriminator, said smallest intermediate output as a response scalar;
       iv) a self-organizing selector for receiving said smallest intermediate output and a node number of said intermediate node which gives said smallest intermediate output and for determining a weights update signal based on node number and said intermediate output from said intermediate node, and a correct class signal from said learning trigger; and
   c) a discriminator for receiving said response vectors and generating a classification response, which includes information indicative of whether classification is possible and also includes an identified class; and
   d) a learning trigger for transferring a correct class signal to said self-organizing classifiers based on a class of said incoming pattern signal and based on said classification response.

2. The self-organizing pattern classification neural network system of claim 1, wherein each said intermediate node comprises:
   element comparators for comparing elements of a feature vector with a template to produce a squared output indicative of a square of a difference between said feature vector and said template;
   an adder for adding outputs of said element comparators to produce an adder output; and
   a square root computer for calculating the square root of said adder output.

3. The self-organizing pattern classification neural network system of claim 2, wherein each said element comparator squares a difference between an element of the feature vector and a scalar of said template and transfers the results to said adder.

4. The self-organizing pattern classification neural network system of claim 2, wherein said templates of said element signals are updated by an update signal from said self-organizing selector.

5. The self-organizing pattern classification neural network system of claim 1, wherein said output node detects a smallest one among said intermediate outputs from intermediate nodes of a class and transfers a node number of said smallest output to said self-organizing selector and also transfers, said smallest output to said discriminator as a response scalar.

6. The self-organizing pattern classification neural network system of claim 1, wherein said self-organizing selector modifies weighting vectors of intermediate node based on node numbers and outputs of intermediate nodes of respective classes which are transferred from said output nodes and a correct class signal from said learning trigger.

* * * * *